United States Patent Office 3,408,369
Patented Oct. 29, 1968

3,408,369
2-SUBSTITUTED-3-KETO-$\Delta^{4,6}$-9$\beta$,10$\alpha$-STEROIDS
Engbert Harmen Reerink, Pieter Westerhof, and Hendrik Frederik Louis Schöler, Van Houtenlaan, Weesp, Netherlands, assignors to North American Philips Company, Inc., New York, N.Y., a corporation of Delaware
Continuation-in-part of applications Ser. No. 201,824, June 12, 1962, and Ser. No. 343,197, Feb. 7, 1964. This application July 16, 1965, Ser. No. 472,704
13 Claims. (Cl. 260—397.3)

ABSTRACT OF THE DISCLOSURE 2 substituted 3 keto or 3-acyloxy 9$\beta$,10$\alpha$ steroids of the pregnane and androstane series. The substituent at the 2 position may be halogen, hydroxy, alkoxy or acyloxy. Specific examples are 2$\beta$-fluoro-17$\beta$-hydroxy, 9$\beta$,10$\alpha$ androst - 4-en-3-one and 2$\beta$-bromo-17$\alpha$-methyl-17$\beta$-acetoxy-9$\beta$,10$\alpha$ androsta-1,4,6-trien-3-one.

The instant application is a continuation-in-part of application Ser. No. 343,197, filed Feb. 7, 1964, now abandoned, which is a division of Ser. No. 201,824, filed June 12, 1962, and now Patent No. 3,198,792.

This invention is concerned with the manufacture of novel 9$\beta$,10$\alpha$-steroids of the general Formula I wherein R$^1$ represents a 3-keto-$\Delta^4$-; 3-keto-$\Delta^{4,6}$-; 3-keto-$\Delta^{1,4}$-;3-keto-$\Delta^{1,4,6}$-, or a 3-acyloxy-$\Delta^{3,5}$-system;

R$^2$ represents a halogen atom or a hydroxy, an alkoxy, or an acyloxy group; and R$^3$ represents a carbonyl group or a group of the formula $$\begin{array}{c} CH_2X \\ | \\ C=O \\ | \\ C--Y \\ / \;\; \backslash \\ 17 \end{array} \quad \text{or} \quad \begin{array}{c} OR \\ | \\ C--Z \\ / \;\; \backslash \\ 17 \end{array}$$

wherein

OR signifies a hydroxy, an alkoxy, or an acyloxy group;
X signifies hydrogen or a halogen atom, or a hydroxy or an acyloxy group;
Y signifies hydrogen, or a hydroxy, an alkoxy, or an acyloxy group; and
Z signifies hydrogen, or a lower alkyl, a lower alkenyl, or a lower alkynyl group.

A halogen atom represented by the symbol R$^2$ is preferably fluoro, chloro or bromo atom, a halogen atom represented by the symbol X is preferably a fluoro atom.

An alkoxy group which may be present in 2,3 or 17-position is preferably an aliphatic, cycloaliphatic or araliphatic alkyl group having 1–10 C atoms. Examples of such groups are: methyl, ethyl, propyl, tert.-butyl, cyclopentyl, cyclohexyl, benzyl, cyclopenten-(1)-yl-oxy, 1'-ethoxy-cyclopentyloxy and tetrahydropyranyloxy. An acyloxy group, which may be present in 2-, 17- or 21-position, is preferably derived from a saturated or unsaturated aliphatic, cycloaliphatic, an araliphatic or an aromatic carboxylic acid having 1–20 C atoms. Examples of such acids are: formic acid, acetic acid, pivalic acid, propionic acid, butyric acid, capronic acid, enanthic acid, oleic acid, palmitic acid, stearic acid, succinic acid, malonic acid, and benzoic acid.

The lower alkyl, alkenyl and alkynyl groups represented by the symbol Z contain preferably 1–5 C atoms. Examples of such groups are: methyl, ethyl, propyl, isopropyl, butyl, iso-butyl, amyl, vinyl, allyl, 1'- and 2'-meth-allyl, ethynyl and propargyl.

The novel 9$\beta$,10$\alpha$-steroids of the general Formula I can be prepared in accordance with methods known per se from the chemistry of the normal series of steroids.

The manufacture of 2-halogen compounds of the general Formula I (R$^2$-halogen) can, for example, be accomplished as follows:

a 2-oxalyl or- 2-hydroxy methylene-9$\beta$-10$\alpha$-steroid of the partial Formula 1 or 2 respectively (1)    (2)

wherein the double bond respresented by the broken line is optional, is reacted with a halogenating agent such as perchlorylfluoride, dichlorodimethyl hydantoin, N-bromo or N-chlorosuccinimide or chlorine, bromine or iodine, followed by treating with a base [see for example the British patent specification No. 875,822, the U.S. patent specification Nos. 3,165,543 and 3,167,546, and J. Am. Chem. Soc., 82, 2840 and 1436 (1960)].

The compounds of the partial Formulae 1 and 2 can be prepared from 3-keto-$\Delta^4$ and 3-keto-$\Delta^{4,6}$-9$\beta$,10$\alpha$-steroids by reacting with oxalic acid esters or formic acid esters.

A 3-keto-$\Delta^{4,6}$-9$\beta$,10$\alpha$-steroid can also be converted directly with N-bromo or N-chlorosuccinimide in dioxane into a 2-bromo-(2-chloro)3-keto-$\Delta^{4,6}$-9$\beta$,10$\alpha$-steroid.

Reacting of a 3-keto-$\Delta^{1,4,6}$-9$\beta$,10$\alpha$-steroid with chlorine or bromine gives 1,2-dichloro-(1,2-dibromo)3-keto-$\Delta^{4,6}$-9$\beta$,10$\alpha$-steroids which give on dehydrohalogenation, for example by treating with pyridine, the 2-chloro-(2-bromo)3-keto-$\Delta^{1,4,6}$-9$\beta$,10$\alpha$-steroid (see for example J. Chem. Soc., 1958, 1324).

A 6-bromo-3-keto-$\Delta^4$-9$\beta$,10$\alpha$-steroid is converted into a 2,2-dichloro-6-bromo-3-keto-$\Delta^4$-9$\beta$,10$\alpha$-steroid by treating with a halogenating agent such as chlorine. Dehydrohalogenation with lithium chloride in dimethylformamide gives then a 2-chloro-3-keto-$\Delta^{1,4,6}$-9$\beta$,10$\alpha$-steroids (see for example J. Chem. Soc., 1958, 1324).

A 2 - chloro - (2-bromo)-3-keto-$\Delta^{4,6}$-9$\beta$,10$\alpha$-steroid can also be prepared from a 3-acyloxy-$\Delta^{2,4,6}$-9$\beta$,10$\alpha$-steroid by treatment with a chlorination or bromination agent such as chlorine or bromine, in alcohol or acetic acid in the presence of potassium acetate or by treatment with N-bromosuccinimide.

Starting from a 3-hydroxy-$\Delta^5$-9$\beta$,10$\alpha$-steroid, there can be obtained by bromination, oxidation and dehydrobromination with collidine a 2-bromo-3-keto-$\Delta^{1,4,6}$-9$\beta$,10$\alpha$-steroid [see for example J. Am. Chem. Soc., 77, 3305 (1955)].

According to an especially preferred procedure, a 3-keto-$\Delta^4$ or a 3-keto$\Delta^{4,6}$-9$\beta$,10$\alpha$-steroid is reacted with oxalic acid ester, especially the ethyl ester in solvents e.g. aromatic hydrocarbons such as benzene, toluene, xylene or in pyridine, at temperatures between room temperature and the boiling temperature of the solvent preferably at 60–70° C. in the presence of a base such as sodium methoxide or ethoxide, sodium hydride or pyridine to give the 2-oxalyl or 2-hydroxy methylene compound of the above-mentioned partial Formula 1 or 2. The 2- oxalyl or 2-hydroxy methylene compounds, respectively are then reacted, if desired under protection of a 20-keto group present, with a halogenating agent e.g. a N-haloamide or imide, respectively, such as N-bromo or N-chlorosuccinimide, N-bromoacetamide, chloramine T or dimethyldichlorohydantoine in a solvent such as acetone, alcohol or dioxane at about −20° to +20° C. in the presence of a base e.g. alkalialkoxide such as sodium methoxide or an acetate such as potassium acetate.

The compounds so obtained can be dehydrogenated in 1, and (if not already present) 6-position using likewise methods known per se from the normal series of steroids, for example, the treatment with dehydrogenation agents such as 2,3-dichloro or 2,3-dibromo-5,6-dicyanobenzochinone or a reaction sequence of bromination and dehydrobromination. A $\Delta^6$ double bond can be further introduced by means of chloranile, a $\Delta^1$ double bond can be introduced in a microbiological manner.

The introduction of a 2-hydroxy or 2-acyloxy group can be accomplished, for example, as follows:

A 3-keto,4,5-epoxy-9$\beta$,10$\alpha$-steroid is heated with acetic acid to reflux giving a 2-acetoxy-9$\beta$,10$\alpha$-steroid. Splitting off the epoxide by heating with sulphuric acid in acetone for a longer time, gives the 2-hydroxy-9$\beta$,10$\alpha$-steroid (see the U.S. patent specification No. 2,910,487). A 2-acetoxy group can further be introduced by treatment of 3-keto-$\Delta^4$-6-bromo-9$\beta$,10$\alpha$-steroid with acetic acid at reflux temperature in a nitrogen atmosphere (see the U.S. patent specification No. 2,857,406), by treatment of 3-keto-$\Delta^4$ or 3-keto-$\Delta^{4,6}$-9$\beta$,10$\alpha$-steroids with lead tetra-acetate in acetic acid (see the U.S. patent specification No. 2,847,428) or with N-bromo-succinimide in carbon tetrachloride followed by the reaction with potassium acetate. Treatment of 3-keto-$\Delta^4$ or 3-keto-$\Delta^{4,6}$-9$\beta$,10$\alpha$-steroids with seleniumdioxide in tert.-butanol and acetic acid gives 2-hydroxy-3-keto-$\Delta^{1,4}$ or 2-hydroxy-3-keto-$\Delta^{1,4,6}$-9$\beta$,10$\alpha$-steroids [see J. Am. Chem. Soc. 80, 1687 (1958)]. Treatment of 3-keto-$\Delta^{1,4}$-9$\beta$,10$\alpha$-steroids with osmiumtetroxide in the presence of pyridine gives 1,2-dihydroxy compounds which can be converted into 3-keto-2-hydroxy-$\Delta^{1,4}$-9$\beta$,10$\alpha$-steroids by dehydration (see the U.S. patent specification No. 3,079,383).

2-hydroxy compounds of the general Formula I can be further prepared by alkaline saponification of the corresponding 2-acetoxy compounds. As the solvents can for example be used in this process, alcohols such as methanol or ethanol or dioxan containing water, as the bases alkali or earth-alkali carbonates such as potassium carbonate, potassium hydrogen carbonate or magnesium carbonate. The 1,2-saturated 2-hydroxy compounds of the general Formula I can be dehydrogenated in 1,2-position by treatment with Bi$_2$O$_3$ [see J. Am. Chem. Soc., 80, 1687 (1958)] or in a microbiological manner (see the U.S. patent specification No. 3,087,864). The 2-hydroxy groups can be esterified in the usual manner, for example by treatment with a reactive acid derivative such as acid anhydrides in the presence of a base.

2-alkoxy compounds of the general Formula I can be obtained from the corresponding 2-hydroxy compounds, for example, by reacting with an alkylhalogenide such as methyliodide in the presence of a base such as potassium-tert.-butylate. A 2-alkoxy group can further be introduced by reacting of a 2-bromo compound with an alkali-alkoxide, for example sodium methoxide.

The novel 9$\beta$,10$\alpha$-steroids of the general Formula I possess hormonal and anti-hormonal activity. For example, the compound 2$\beta$-fluoro-17$\beta$-hydroxy-9$\beta$,10$\alpha$-androst-4-en-3-one shows uterotrophic activity, the compound 2$\beta$-fluoro - 17$\alpha$ - methyl-17$\beta$-hydroxy-9$\beta$,10$\alpha$-androsta-4,6-dien-3-one, the compound 2$\beta$-chloro-17$\alpha$-methyl-17$\beta$-acetoxy-9$\beta$,10$\alpha$-androsta-1,4,6-trien-3-one and the compound 2$\beta$-bromo-17$\alpha$-methyl-17$\beta$-acetoxy-9$\beta$,10$\alpha$-androsta-1,4,6-trien-3-one show anti-gonadotrophic activity and the compound 2$\beta$-chloro-9$\beta$,10$\alpha$-pregna-1,4,6-triene-3,20-dione shows anti-androgenic activity.

The compounds of this invention may be used as medicaments in the form of pharmaceutical preparations, which contain the compounds in admixture with a pharmaceutical organic or inorganic, solid or liquid carrier suitable for enteral, e.g. oral, or parenteral administration. For making up the preparations there may be employed substances which do not react with the compounds, such as water, gelatine, lactose, starches, magnesium stearate, talc, vegetable oils, gums, polyalkylene glycols, petroleum jelly or any other known carrier used for the preparation of medicaments. The pharmaceutical preparations may be in solid form, for example as tablets, dragées, suppositories or capsules, or in liquid form, for example as solutions, emulsions or suspensions. If desired, they may be sterilized and/or contain auxiliary substances, such as preserving agents, stabilizing agents, wetting or emulsifying agents, salts for varying the osmotic pressure or buffers. They may also contain, in combination, other therapeutically useful substances.

Example 1

500 ml. of benzene were added to a solution prepared from 4.01 g. sodium and 70 ml. of methanol followed by distilling off azeotropically the excess of methanol. To the suspension obtained, 13.2 ml. ethyl formate and a solution of 25 g. of 9$\beta$,10$\alpha$-androst-4-ene-3,17-dione in 250 ml. of benzene were added and the reaction mixture was heated to reflux for 20 minutes. After cooling the solution was filtered and the residue was washed with benzene and dried. There were obtained 24 g. of plate-chromatographically uniform 2-hydroxymethylene-9$\beta$,10$\alpha$-androst-4-ene-3,17-dione. U.V.: $\lambda_{max}$ 244 and 303 nm. $\epsilon$=8,300 and 14,700.

To a solution of 24 g. of this compound in 750 ml. of methanol there was added a solution from 2.1 g. of sodium and 85 ml. of methanol at 20° followed by passing through the solution perchlorylfluoride during 80 minutes. After removal of the cooling bath nitrogen was blown through the solution. The reaction mixture was then concentrated to half the volume and after addition of 47 g. of anhydrous potassium acetate heated to reflux for 90 minutes. After filtration the solution was extracted with ethyl acetate and the extract was washed with water, 0.5 N sodium hydroxide solution and water, dried and evaporated. The yellow oil obtained (9.5 g.) was chromatographed on silica gel collecting 25 ml. fractions. Fractions 195–310 contained a mixture of 2$\alpha$- and 2$\beta$-fluoro-9$\beta$,10$\alpha$-androst-4-ene-3,17-dione. Fractions 311–488 contained substantially pure 2$\beta$-isomer, which gave after recrystallization from ethyl acetate-isopropyl ether pure 2$\beta$-fluoro-9$\beta$,10$\alpha$-androst-4-ene-3,17-dione. Melting point: 132–133°. U.V.: $\lambda_{max}$ 240 nm. $\epsilon$=15,700, $[\alpha]589 = -104°$ (in dioxane).

Example 2

20 ml. of ethyl formate were added to a solution of 5.8 g. of 9$\beta$,10$\alpha$-testosterone in 70 ml. of pyridine. After the addition of a solution prepared from 940 mg. of sodium and 10 ml. of methanol the reaction mixture was stirred for 24 hours at room temperature and then extracted with ether. The extract was washed with 200 ml. of 20% acetic acid and re-extracted three times with 200 ml. each of 4% sodium hydroxide solution. The alkaline extract was acidified with acetic acid and re-extracted with ethyl acetate. After working-up this extract afforded 5.0 g. of crude 2-hydroxymethylene-17$\beta$-hydroxy-9$\beta$,10$\alpha$-androst-4-en-3-one. U.V. $\lambda_{max}$ 243 and 304 nm. $\epsilon$=8,800 and 14,200.

By treating this compound with perchlorylfluoride according to Example 1 there was obtained the 2$\beta$-fluoro-17$\beta$ - hydroxy - 9$\beta$,10$\alpha$-androst-4-en-3-one. Melting point: 164–166° (from methylene chloride-isopropyl ether). U.V.: $\lambda_{max}$ 242 nm. $\epsilon$=15,000, $[\alpha]589 = -153°$ (in dioxane).

Example 3

By a procedure analogous to that described in Example 1, 17α-ethynyl-9β,10α-testosterone was converted into the 2 - hydroxymethylene - 17β-hydroxy-9β,10α-androst-4-en-3-one-sodium salt. Treating this compound with perchlorylfluoride according to Example 1 afforded 2β-fluoro-17α - ethynyl - 17β - hydroxy-9β,10α-androst-4-en-3-one. Melting point: 146–150°. U.V.: $\lambda_{max}$ 241 nm. $\epsilon=14,200$.

This compound was also obtained by reacting the 2β-fluoro-9β,10α-androst-4-en-3-one (described in Example 1) with potassium acetylide in fluid ammonia.

Example 4

A suspension of 500 mg. lithium aluminium hydride in 80 ml. of ether was added dropwise to a solution of 500 mg. of 2β-fluoro-9β,10α-androst-4-ene-3,17-dione (prepared according to Example 1) in 50 ml. of absolute tetrahydrofuran. After 50 minutes, the excess of the hydride was decomposed by addition of moist ether and the reaction mixture was filtered. The filtrate was evaporated, the residue taken up in dioxane and after addition of 600 mg. of 2,3-dichloro-5,6-dicyano-benzoquinone stirred for 3 hours in a nitrogen atmosphere. After reduction of the excess dehydrogenating agent by means of sulfur dioxide and working-up there were obtained 320 mg. of 2β-fluoro-17β-hydroxy-9β,10α-androst-4-en-3-one, which was identical with the compound obtained according to Example 2.

Example 5

By a procedure analogous to that described in Example 1, there was prepared from 17β-hydroxy-9β,10α-androsta-4,6-dien-3-one the compound 2-hydroxymethylene-17β hydroxy - 9β,10α - androsta - 4,6-diene-3-one-sodium salt. Melting point (crude): 244–246° (decomposition). U.V.: $\lambda_{max}$ 288 nm. $\epsilon=11,020$.

This compound gave with perchlorylfluoride the 2α-fluoro-17β-hydroxy-9β,10α-androsta-4,6-dien-3-one. Melting point: 164–165°. U.V.: $\lambda_{max}$ 295 nm. $\epsilon=25,300$, $[\alpha]589=-566°$ (in dioxane), and the 2β-fluoro-17β-hydroxy-9β,10α-androsta-4,6-dien-3-one. Melting point 146–147°. U.V.: $\lambda_{max}$ 287 nm. $\epsilon=25,500$, $$[\alpha]589=-643°$$

(in dioxane).

Example 6

A solution of 200 mg. of 2β-fluoro-17β-hydroxy-9β,10α-androsta-4,6-dien-3-one in 10 ml. of acetone was treated with Jones-reagent until the solution remained orange in colour. After working-up, there were obtained 150 mg. of 2β - fluoro - 9β,10α - androsta - 4,6-dien-3,17-dione. Melting point: 241–243°. U.V.: $\lambda_{max}$ 284 nm. $\epsilon=24,800$, $[\alpha]589=-564°$ (in dioxane).

Example 7

3.42 g. of 17α-methyl-17β-acetoxy-9β,10α-androsta-4,6-dien-3-one, 1.5 ml. of ethyl formate and 1.1 g. of sodium methylate in 40 ml. of benzene were heated to reflux for 5 minutes. After cooling, the precipitated mixture of the sodium salts of the hydroxymethylene compounds was filtered off and dissolved in water. The solution was acidified with 4 N hydrochloric acid and extracted with methylene chloride. After working-up and chromatography on silica gel there were obtained the 2 - hydroxymethylene - 17α-methyl-17β-acetoxy-9β,10α-androsta - 4,6 - dien - 3 - one. Melting point: 128° (from ether). U.V.: $\lambda_{max}$ 293 nm. $\epsilon=18,300$, and the 2-hydroxymethylene - 17α - methyl - 17β-hydroxy-9β,10α-androsta-4,6-dien-3-one. Melting point: 135–138° (from ether). U.V.: $\lambda_{max}$ 296 nm. $\epsilon=16,500$, $[\alpha]589=-418°$ (in dioxane).

From the latter compound there were prepared according to Example 1 the 2α-fluoro-17α-methyl-17β-hydroxy-9β,10α-androsta-4,6-dien-3-one. Melting point: 122–123° (from isopropyl ether). U.V.: $\lambda_{max}$ 295 nm. $\epsilon=25,100$, $[\alpha]589=-580°$ (in dioxane), and the 2β-fluoro-17α-methyl - 17β - hydroxy - 9β-10α-androsta-4,6-dien-3-one. Melting point: 150–153° (from isopropyl ether). U.V.: $\lambda_{max}$ 288 nm. $\epsilon=25,000$, $[\alpha]589=-672°$ (in dioxane).

Example 8

By a procedure analogous to that described in Example 7, there was prepared from 17α-ethinyl-17β-acetoxy-9β,10α-androsta-4,6-dien-3-one, the compound 2-hydroxymethane - 17α - ethinyl - 17β - hydroxy - 9β,10α-androsta-4,6-dien-3-one. The sodium salt of this compound was fluorinated according to Example 1 and yielded 2β - fluoro - 17α - ethinyl - 17β - hydroxy - 9β,10α-androsta-4,6-dien-3-one. Melting point: 215–216° (from methylene chloride-isopropyl ether). U.V.: $\lambda_{max}$ 287 nm. $\epsilon=26,000$, $[\alpha]589=-752°$ (in dioxane).

Example 9

5.0 g. of oxalic acid diethyl ester were added to a suspension of 1.19 g. of sodium methylate in 120 ml. of benzene at 25°. After the addition of 3.12 g. of 9β,10α-pregna-4,6-diene-3,20-dione the reaction mixture was stirred for 18 hours. Thereafter, 150 ml. of ether were added and the precipitate was filtered off, washed with ether and dried in a vacuum at 50°. This crude product was fluorinated according to Example 1. From the reaction product there was isolated by chromatography the 2β - fluoro - 9β,10α - pregna - 4,6 - diene - 3,20 - dione. Melting point: 156–157° U.V.: $\lambda_{max}$ 286 nm. $\epsilon=26,000$, $[\alpha]589=-511°$ (in dioxane).

Example 10

400 mg. of 2β-fluoro-17β-hydroxy-9β,10α-androst-4-en-3-one, 500 mg. of chloranil and 30 ml. of tert. butanol were heated to reflux for 16 hours under nitrogen. After working-up and chromatography there were obtained 125 mg. of 2β-fluoro-17β-hydroxy-9β,10α-androsta-4,6-dien-3-one, which was identical with the compound obtained according to Example 5.

Example 11

5 g. of 2β - fluoro - 17β - hydroxy - 9β,10α - androst - 4-en-3-one (obtained according to Example 2) were dissolved in 175 ml. of benzene. After the addition of 0.5 g. of p-toluene sulfonic acid, 600 ml. of the solvent were slowly distilled off while continuously replacing the distillate by fresh benzene. Thereafter, 12.5 ml. of isopropenyl acetate were added and the reaction mixture was heated to reflux for 2 hours. The addition of the isopropenyl acetate and heating was repeated followed by distilling off 100 ml. of the solvent and adding 0.35 ml. of pyridine. The precipitate was filtered off, and the filtrate evaporated. Chromatography of the residue gave 4.5 g. of 2β-fluoro-3,17β-acetoxy-9β,10α-androsta-3,5-diene. U.V.: $\lambda_{max}$ 239 nm. $\epsilon=16,500$.

Example 12

A solution of 24 g. of 17β-diacetoxy-9β,10α-androsta-4-en-3-one in 170 ml. of glacial acetic acid was added to a solution of 35 g. of lead tetra acetate in 420 ml. of glacial acetic acid. The reaction mixture was then heated to 90° under nitrogen. After 3 hours, a further 30 g. of lead tetra acetate was added and the mixture was stirred for a further 18 hours. The reaction mixture was then worked up and chromatographed on silica gel. There were obtained 3.2 g. of 2α,17β-diacetoxy-9β,10α-androst-4-en-3-one. Melting point 161–163°. U.V.: $\lambda_{max}$ 243 nm. $\epsilon=15,800$, $[\alpha]589=-15°$ (in dioxane), and 4.5 g. of 2α,17β-diacetoxy-9β,10α-androst-4-en-3-one, melting point 193–195°. U.V.: $\lambda_{max}$ 240 nm. $\epsilon=15,900$, $[\alpha]589=-135°$ (in dioxane).

Example 13

A solution of 370 ml. of chlorine in 5 ml. of acetic acid was added to a solution of 1.50 g. 17α-methyl-17β- acetoxy - 9β,10α - androsta - 1,4,6 - trien - 3 - one in 3 ml. methylene chloride and 40 ml. of ether at −20°. The mixture was kept at −20° for 5 hours then poured on water and extracted with methylene chloride. The extract was washed until neutral with water, dried and evaporated and the residue was kept with 10 ml. pyridine at room temperature for 30 minutes. The mixture was then cooled, poured on ice water/diluted hydrochloric acid and extracted with ether. The crystallization of the crude products from ether afforded 2-chloro-17α-methyl-17β - acetoxy - 9β,10α - androsta - 1,4,6 - trien - 3 - one. Melting point: 164–165° C., $[\alpha]_D^{25°}=-437°$ (in dioxane). U.V.: $\lambda_{max}$ 216 nm. $\epsilon=15,300$; 265 nm. $\epsilon=11,500$; 308 nm. $\epsilon=10,400$.

Example 14

By a procedure analogous to that of Example 13 there was obtained from 17α-methyl-17β-hydroxy - 9β,10α-androsta-1,4,6-trien-3-one, the compound 2-chloro-17α-methyl - 17β - hydroxy - 9β,10α - androsta - 1,4,6 - trien-3-one. Melting point: 201–203° C. (from ether), $[\alpha]_D^{25°}=-485°$ (in dioxane).

Example 15

By a procedure analogous to that of Example 13 there was obtained from 9β,10α-pregna-1,4,6-triene-3,20-dione the compound 2-chloro-9β,10α-pregna-1,4,6-triene-3,20-dione. Melting point: 122–123° C., $[\alpha]_D^{25°}=-332°$ (in dioxane). U.V.: $\lambda_{max}$ 212 nm. $\epsilon=15,000$; 263 nm. $\epsilon=10,850$; 309 nm. $\epsilon=10,100$.

Example 16

By a procedure analogous to that of Example 13 using bromine as the halogenating agent there was obtained from 17α - methyl - 17β - acetoxy - 9β,10α - androsta-1,4,6-trien-3-one the compound 2-bromo-17α-methyl-17β-acetoxy - 9β,10α - androsta - 1,4,6 - trien - 3 - one. Melting point: 132–134° (from ether-hexane), $[\alpha]_D^{25°}=-403°$ (in dioxane). U.V.: $\lambda_{max}$ 218 nm. $\epsilon=15,800$; 268 nm. $\epsilon=12,100$; 309 nm. $\epsilon=10,100$.

Example 17

3.09 g. N-bromosuccinimide and 0.7 ml. 70% perchloric acid were added to a solution of 4.0 g. 17α-methyl-17β - hydroxy - 9β,10α - androsta - 4,6 - dien - 3 - one in 200 ml. of dioxane. The solution was kept at room temperature for 5 hours, poured on ice water and extracted with ether. The extract was washed with 2-N-sodium hydroxide solution and water until neutral, dried over sodium sulphate and evaporated. The residue was chromatographed on 250 g. silica gel. The benzene acetone-(97:3)-fractions which were uniform according to thin-layer chromatography were re-crystallized from acetone isopropyl ether and gave 2β-bromo-17α-methyl-17β-hydroxy - 9β,10α - androsta - 4,6 - dien - 3 - one. Melting point: 119–121° C., $[\alpha]_D^{25°}=-655°$ (in dioxane). U.V.: $\lambda_{max}$ 291 nm. $\epsilon=24,100$.

Example 18

A solution of 2.0 g. of 9β,10α-pregna-4,6-diene-3,20-dione and 2.83 g. lead tetra acetate in 60 ml. of acetic acid was heated to 80° C. for 15 hours. The reaction mixture was poured on ice water and extracted with ether. The material extracted afforded on chromatography on silica gel with ether petrol ether-(1:1)-elution pure 2β-acetoxy - 9β,10α - pregna - 4,6 - diene-3,20-dione. Melting point: 185–187° C. (from acetone-hexane), $[\alpha]_D^{25°}=-422°$ (in dioxane). U.V.: $\lambda_{max}$ 284 nm. $\epsilon=26,400$.

Example 19

A solution of 4.5 g. of potassium acetate in 85% acetic acid was added to a solution of 2.3 g. of 17α-methyl-3,17β-diacetoxy-9β,10α-androsta-2,4,6-triene in 120 ml. of ether. To this mixture there was added a solution of 460 mg. of chlorine in 12 ml. of acetic acid at −5° within 5 minutes. The mixture was stirred for 15 minutes then poured on water and extracted with ether. The extract afforded 2.6 g. of a crude product which was chromatographed on silica gel. The cyclohexane-ether (1:1)-fractions which were uniform according to thin-layer chromatography gave 2β-chloro-17α-methyl-17β-acetoxy-9β,10α-androsta-4,6-dien-3-one. Melting point: 173–174°, $[\alpha]_D^{25°}=-599°$ (in dioxane). U.V.: $\lambda_{max}$ 286 nm. $\epsilon=25,300$.

The starting material 17α-methyl-3,17β-diacetoxy-9β,10α-androsta-2,4,6-triene was obtained by reacting 17α-methyl-17β-acetoxy-9β,10α-androsta-4,6-dien-3-one with isopropenylacetate in the presence of p-toluene sulfonic acid in benzene and chromatography of the reaction mixture on aluminum oxide. Melting point: 165–167° (from acetone-hexane). U.V.: $\lambda_{max}$ 300 nm. $\epsilon=13,300$.

Example 20

By heating of 6-bromo-17β-acetoxy-9β,10α-androst-4-en-3-one with potassium acetate under nitrogen for several hours there was obtained the 2,17β-diacetoxy-9β,10α-androst-4-en-3-one as a mixture of the 2α- and 2β-isomers. Melting point: 184–186° (from methanol). U.V.: $\lambda_{max}$ 242 nm. $\epsilon=15,700$.

The mixture of the isomers can be separated by plate-chromatography to give the isomers described in Example 12.

Example 21

By a procedure analogous to that of Example 9 there was obtained from 9β,10α-pregn-4-ene - 3,20.- dione the compound 2β-fluoro-9β,10α-pregn-4-ene-3,20-dione. Melting point: 162–164°. U.V.: $\lambda_{max}$ 242 nm. $\epsilon=15,300$.

Example 22

By a procedure analogous to that of Example 9 there was obtained from 17α-hydroxy - 9β,10α - pregna-4,6-diene-3,20-dione the compound 2β-fluoro-17α-hydroxy-9β,10α-pregna - 4,6 - diene-3,20-dione. Melting point: 232–238°.

Example 23

By a procedure analogous to that of Example 9 there was obtained from 17α-acetoxy-9β,10α-pregna-4,6-diene-3,20-dione the compound 2β-fluoro-17α-acetoxy-9β,10α-pregna-4,6-diene-3,20-dione. Melting point: 204–205°. U.V.: $\lambda_{max}$ 287 nm. $\epsilon=26,100$.

Example 24

By a procedure analogous to that of Example 9 there was obtained from 21-acetoxy-9β,10α-pregna-4,6-diene-3,20-dione the compound 2β-fluoro-21-acetoxy-9β,10α-pregna-4,6-diene-3,20 - dione. Melting point: 166–168°. U.V.: $\lambda_{max}$ 286 nm. $\epsilon=25,000$.

Example 25

By saponification of the 2,17β - diacetoxy - 9β,10α - androst-4-en-3-one (obtained according to Example 20) with potassium carbonate with methanol, oxidation of the hydroxy compound with $Bi_2O_3$ followed by esterification with acetic anhydride in the presence of pyridine there was obtained 2,17β-diacetoxy-9β,10α-androsta-1,4-dien-3-ene. Melting point: 182–184°. U.V.: $\lambda_{max}$ 245.5 nm. $\epsilon=16,200$.

Example 26

By a procedure analogous to that of Example 12 there was obtained from 17α-methyl-17β-acetoxy-9β,10α-androsta-4,6-dien-3-one the compound 2α,17β-diacetoxy-17α-methyl-9β,10α-androsta-4,6 - dien - 3 - one. Melting point: 178–180°. U.V.: $\lambda_{max}$ 292 nm., $\epsilon=26,000$, and the 2β-isomer, melting point 177–178°. U.V.: $\lambda_{max}$ 284 nm. $\epsilon=27,000$, $[\alpha]_D^{25°}=-490°$ (in dioxane).

Example 27

To a solution of 6.9 g. of 17α-methyl-17β-acetoxy-9β,10α-androst-4-en-3-one in 100 ml. of anhydrous tert. butanol there was added 5.8 g. of ethyl oxalate and then 1.62 g. of sodium methoxide in 10 ml. of methanol at 65°, under nitrogen. The reaction mixture was kept at 65° for 30 minutes then cooled, diluted with 100 ml. of ether and filtered off. The precipitate consisting of sodium enolate of the oxalyl compound was dissolved in 150 ml. of methanol and treated with a solution of 2.0 g. of 1,3 - dichloro - 5,5 - dimethyl-hydantoin in 50 ml. of methanol. After working-up there was obtained the 2-chloro-2-oxalyl compound which was treated with 250 ml. of sodium methylate in methanol. The mixture was poured on ice water extracted with ether and the ether extract was worked-up. The residue was chromatographed on 700 g. of silica gel using petrolether-ether (3:1) as the elution agent. There was obtained 2β-chloro-17α-methyl-17β-acetoxy - 9β,10α - androst-4-en-3-one. Melting point: 175–176° (ether-isopropylether), $[\alpha]_D^{25°} = +10°$ (in dioxane). U.V.: $\lambda_{max}$ 234 nm. $\epsilon = 15,100$, and the 2α-chloro-17α-methyl-17β-acetoxy-9β,10α-androst-4-en-3-one, melting point 142–144° (from ether-isopropylether), $[\alpha]_D^{25°} = -167°$ (in dioxane). U.V.: $\lambda_{max}$ 242 nm. $\epsilon = 15,800$.

Example 28

A solution of 2.0 g. of 2β-chloro-17α-methyl-17β-acetoxy-9β,10α-androst-4-en-3-one, 1.6 g. 2,3 - dichloro-5,6-dicyanobenzoquinone and 90 ml. of dioxane containing 6.5% hydrogen chloride was stirred at 25° for 90 minutes. After usual working-up there was obtained 1.9 g. of crude product which gave on re-crystallization from acetone-isopropylether pure 2β - chloro-17α-methyl-17β-acetoxy-9β,10α-androsta-4,6-dien-3 - one. Melting point: 172–173°.

We claim:
1. 2α-fluoro - 17β - hydroxy-9β,10α-androsta-4,6-dien-3-one.
2. 2β-fluoro-17β-hydroxy-9β,10α-androsta - 4,6 - dien-3-one.
3. 2β-fluoro-17α - methyl - 17β - hydroxy-9β,10α-androsta-4,6-dien-3-one.
4. 2β-chloro-17α-methyl-17β-acetoxy - 9β,10α - androsta-1,4,6-trien-3-one.
5. 2β-bromo - 17α - methyl-17β-acetoxy-9β,10α-androsta-1,4,6-trien-3-one.
6. 2β-chloro-9β,10α-pregna-1,4,6-triene-3,20-dione.
7. 2-hydroxymethylene-9β,10α-androst - 4 - ene - 3,17-dione.
8. 3,17β-diacetoxy-17α - methyl-9β,10α-androsta-2,4,6-triene.
9. A compound of the formula

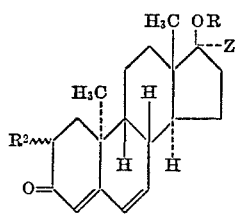

wherein OR is a member selected from the group consisting of hydroxy, alkoxy of 1–10 carbon atoms and acyloxy of aliphatic acids of 1–20 carbon atoms and benzoic acid, $R^2$ is a member selected from the group consisting of halogen, hydroxy, alkoxy of 1–10 carbon atoms and acyloxys of aliphatic acids of 1–20 carbon atoms and benzoic acid, and Z is a member selected from the group consisting of hydrogen, alkyl of 1–5 carbon atoms, alkenyl of 2–5 carbon atoms and alkynyl of 2–5 carbon atoms.

10. A compound of the formula

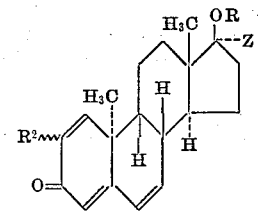

wherein OR is a member selected from the group consisting of hydroxy, alkoxy of 1–10 carbon atoms and acyloxy of aliphatic acids of 1–20 carbon atoms and benzoic acid, $R^2$ is a member selected from the group consisting of halogen, hydroxy, alkoxy of 1–10 carbon atoms and acyloxys of aliphatic acids of 1–20 carbon atoms and benzoic acid, and Z is a member selected from the group consisting of hydrogen, alkyl of 1–5 carbon atoms, alkenyl of 2–5 carbon atoms and alkynyl of 2–5 carbon atoms.

11. A compound of the formula

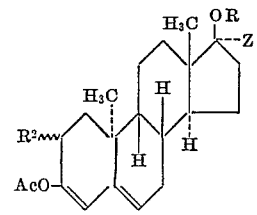

wherein Ac is acyl, wherein OR is a member selected from the group consisting of hydroxy, alkoxy of 1–10 carbon atoms and acyloxy of aliphatic acids of 1–20 carbon atoms and benzoic acid, $R^2$ is a member selected from the group consisting of halogen, hydroxy, alkoxy of 1–10 carbon atoms and acyloxys of aliphatic acids of 1–20 carbon atoms and benzoic acid, and Z is a member selected from the group consisting of hydrogen, alkyl of 1–5 carbon atoms, alkenyl of 2–5 carbon atoms and alkynyl of 2–5 carbon atoms.

12. A compound of the formula

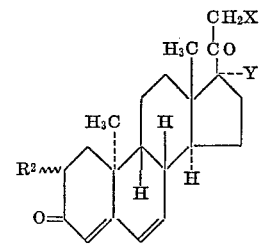

wherein $R^2$ is a member selected from the group consisting of halogen, hydroxy, alkoxy of 1–10 carbon atoms and acyloxys of aliphatic acids of 1–20 carbon atoms and benzoic acid, X is a member selected from the group consisting of hydrogen, halogen, hydroxy and acyloxy of aliphatic acids of 1–20 carbon atoms and benzoic acid, and Y is a member selected from the group consisting of hydrogen, hydroxy, alkoxy of 1–10 carbon atoms and acyloxy of aliphatic acids of 1–20 carbon atoms and benzoic acid.

13. A compound of the formula

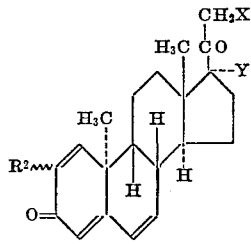

wherein $R^2$ is a member selected from the group consisting of halogen, hydroxy, alkoxy of 1–10 carbon atoms and acyloxys of aliphatic acids of 1–20 carbon atoms and benzoic acid, X is a member selected from the group consisting of hydrogen, halogen, hydroxy and acyloxy of aliphatic acids of 1–20 carbon atoms and benzoic acid, and Y is a member selected from the group consisting of hydrogen, hydroxy, alkoxy of 1–10 carbon atoms and acyloxy of aliphatic acids of 1–20 carbon atoms and benzoic acid.

References Cited

UNITED STATES PATENTS

| | | | |
|---|---|---|---|
| 3,080,392 | 3/1963 | Edwards et al. | 260—397.4 |
| 3,132,137 | 5/1964 | Clinton | 260—239.5 |
| 3,232,960 | 2/1966 | Magerlein | 260—397.1 |

ELBERT L. ROBERTS, *Primary Examiner.*

UNITED STATES PATENT OFFICE
CERTIFICATE OF CORRECTION

Patent No. 3,408,369                October 29, 1968

Engbert Harmen Reerink et al.

It is certified that error appears in the above identified patent and that said Letters Patent are hereby corrected as shown below:

Column 2, line 13, for "($R^2$-halogen)" read -- ($R^2$=halogen) --; column 6, line 9, for "hydroxymethane" read -- hydroxymethylene --.

Signed and sealed this 15th day of July 1969.

(SEAL)
Attest:

Edward M. Fletcher, Jr.                WILLIAM E. SCHUYLER, JR.
Attesting Officer                        Commissioner of Patents